United States Patent [19]

Gerlach

[11] Patent Number: 4,819,702
[45] Date of Patent: Apr. 11, 1989

[54] APPARATUS FOR CHARGING A FILLER CONNECTION

[75] Inventor: Roland Gerlach, Hamburg, Fed. Rep. of Germany

[73] Assignee: Claudius Peters AG, Fed. Rep. of Germany

[21] Appl. No.: 84,171

[22] Filed: Aug. 12, 1987

[30] Foreign Application Priority Data

Aug. 16, 1986 [DE] Fed. Rep. of Germany ... 8621956[U]

[51] Int. Cl.$^4$ ................................................ B67C 3/34
[52] U.S. Cl. ..................................... 141/232; 141/387
[58] Field of Search ............... 141/232, 283, 284, 367, 141/387, 231, 233; 277/DIG. 4, DIG. 7

[56] References Cited

U.S. PATENT DOCUMENTS

| | | | |
|---|---|---|---|
| 367,599 | 8/1887 | Conant | 141/387 |
| 2,763,419 | 9/1956 | Brown et al. | 141/367 X |
| 4,224,968 | 9/1980 | Bosser et al. | 141/232 X |
| 4,445,548 | 5/1984 | Neumann | 141/387 X |
| 4,561,572 | 12/1985 | Gründler | 141/284 X |

FOREIGN PATENT DOCUMENTS

| | | | |
|---|---|---|---|
| 507980 | 5/1953 | Belgium | 141/232 |
| 1219392 | 6/1966 | Fed. Rep. of Germany . | |
| 94585 | 6/1960 | Netherlands | 141/232 |
| 616211 | 7/1978 | U.S.S.R. | 141/284 |

Primary Examiner—Stephen Marcus
Attorney, Agent, or Firm—Eric P. Schellin

[57] ABSTRACT

There is disclosed a filling device for powdered material. The filling device is to be employed between a stationary fill tube and a vehicle positioned vertically therebelow. The filling device includes a funnel that is mounted on a double carriage whereby one carriage moves in one direction and the other carriage is movable transverse to the movement of the first. Sealing means is provided to inhibit the escape of the powdered material to the environment.

2 Claims, 2 Drawing Sheets

APPARATUS FOR CHARGING A FILLER CONNECTION

BACKGROUND OF THE INVENTION

The invention relates to a device for charging a filler connection, e.g. the tank of a truck or railroad car, which is open on top, extends in a horizontal direction and can vary in position. The charging occurs from a stationary supply connection under which a movable funnel like structure extends in a suitable direction. The device is located on stationary guide means, the bottom of which funnel like structure is inclined in a direction toward its discharge opening and which is sealed on its top against the ambient atmosphere and is also connected to a vent line.

The device is used to load tank vehicles with powdered material.

Such a device is already known in which the movable funnel like structure is located on an undercarriage and can only be moved in a straight line over the filler connection of the vehicles.

This requires that either the vehicles can be parked precisely in the center of the loading area or that track connected vehicles are to be loaded. It is also possible to draw the flexible loading bellows of the loading apparatus under the trough discharge slightly to the side in an oblique manner in order to reach the inlet connection of the vehicle tank to be loaded.

It was suggested in the case of greater deviations that loading wagons be used which could be moved like a travelling crab in a hangar crane. However, this assumes a movable conveyor device for the inlet of the loading trough. Articulated grooves and flexible conveyor hoses have already been used for this. However, they require a considerable initial expense and greater total height.

In addition, it has been suggested for small transversal travel paths that two funnel like troughs be arranged over one another. Both troughs move in common in a straight line in the longitudinal direction of the stationary guide device and the second, lower trough can be additionally moved transversely within the undercarriage. This requires twice the total funnel height and twice the necessary seal against the outside above the funnel because no material and no dust may exit form the loading device when loading vehicles with dustlike or powdered material on the way into the vehicle filler connection.

SUMMARY OF THE INVENTION

The invention has the object of developing a loading device with a relatively low total height which can be moved longitudinally and transversally in which the sealing expense is kept extremely low.

This object is solved in that the movable trough is located on a second guide device running transversally to the stationary guide device and that its side walls, inclined in this transversal direction, run toward the discharge.

The trough which can be moved in one direction is designed so that its oblique bottom surfaces over which the loading material passes to the discharge run in the longitudinal direction, that is, in the direction of travel. The side walls are vertically positioned. A cover is located over the trough itself and extends in the direction of travel beyond the trough.

According to the invention, the side walls of the trough are obliquely positioned which means the trough is wider at the top than at the bottom at its discharge.

The cover, which is permanently connected to the supply connection, is widened in conformity with the transverse travel path.

A separate undercarriage with separate drive is provided for the direction of travel running transversally to the stationary guide device so that all filler connections of any of the vehicles can be reached by remote control without transversal forces acting on the loading apparatus.

The cover over the trough should be horizontally level and is permanently connected to the stationary filler connection. This has the advantage that a simple sliding seal in the form of a lip, an elastic bead or a brush is sufficient as seal between the stationary part and the movable part of the device.

According to another feature of the invention, a dedusting connection is located to the side of the stationary inlet connection in the transversal direction of travel under which dedusting connection an air baffle is located in the trough on the same side.

The air displaced during loading from the vehicle container to be loaded is guided via a double bellows loading device to the trough of the loading device and conducted via a baffle located at the side of the trough in such a manner to the dedusting connection that it does not hinder the flow of material conducted through the device but rather passes by it on the side in a separated manner.

BRIEF DESCRIPTION OF THE DRAWINGS

The invention is described in more detail in the following with reference made to the drawings, which show an embodiment of the invention.

DETAILED DESCRIPTION OF THE INVENTION

Figure 1:
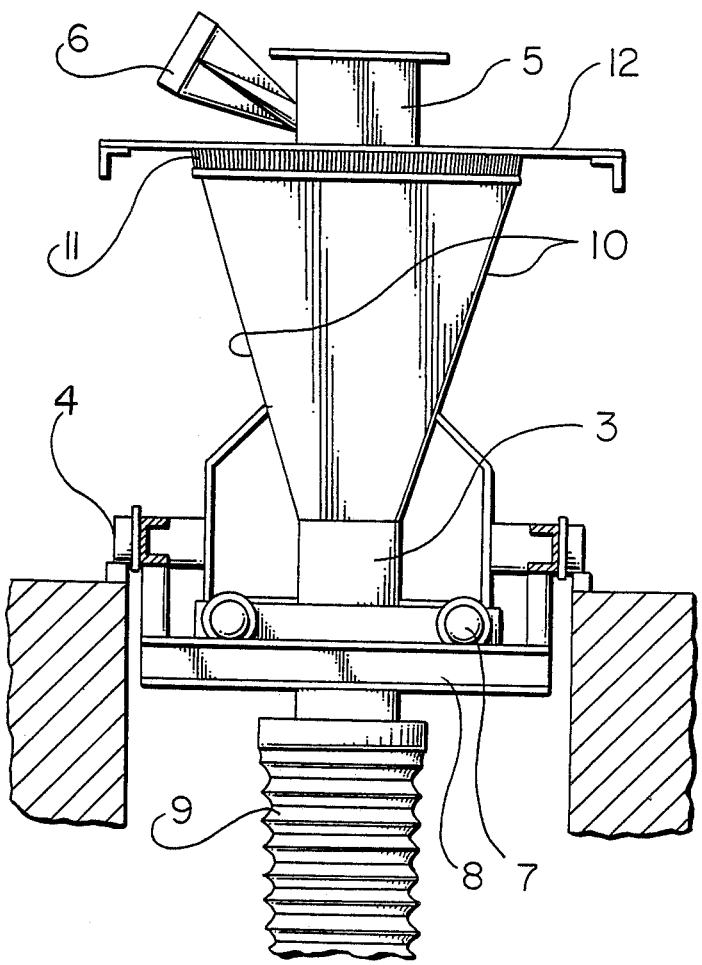
FIG. 1 shows a section through the longitudinal guide apparatus with the apparatus in the transversal direction.

Both figures show the basic design of the movable loading device. The latter consists of funnel-like trough 1 whose bottom 2 runs to discharge 3 in the form of inclined walls. The trough can be moved in two directions. It travels via rollers 4 in the longitudinal direction while filler connection 5 is stationarily located with an infeed component, e.g., a silo discharge. A dedusting line which runs to a dedusting filter is connected to dedusting connection 6.

Figure 2:
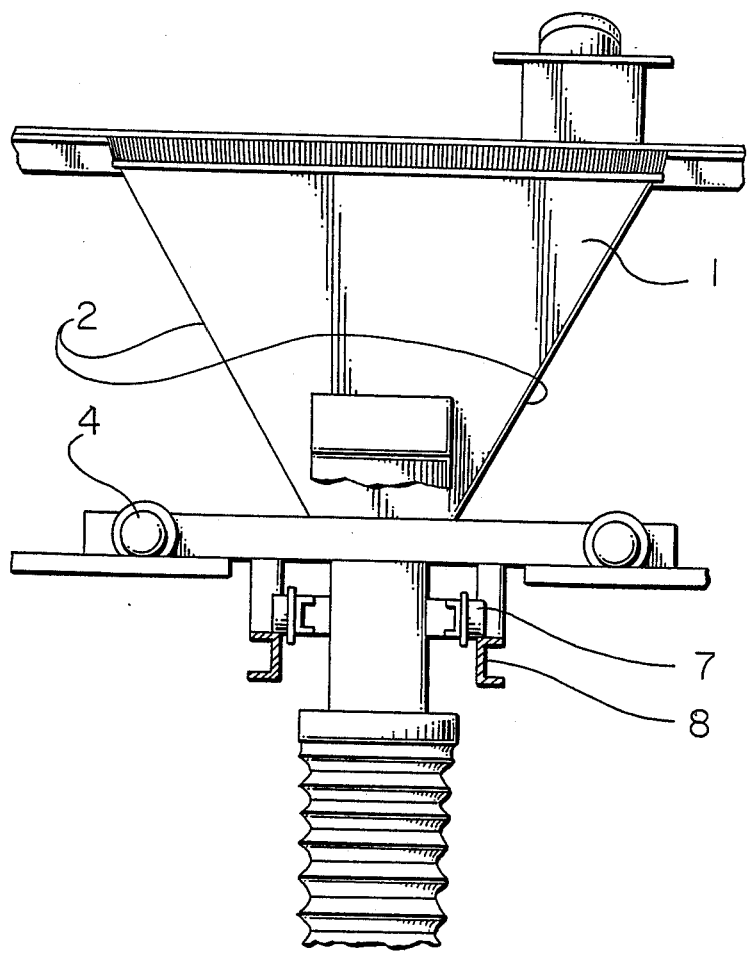
FIG. 2 shows a side view of the apparatus in the longitudinal direction.

FIG. 1 shows the trough in middle position and FIG. 2 shows it in an end position. Supply connection 5 is shown thereby over the upper end of bottom 2.

In both views, a second undercarriage 7 is guided in guide device 8. This second undercarriage functions as a transversal undercarriage. Guide device 8 is held in the frame of the longitudinal undercarriage. This makes it possible for trough 1 with loading apparatus 9 to be moved both in the longitudinal direction and also in the transversal direction.

Side walls 10 of trough 1 run obliquely downward from above. The upper interval of side walls 10 depends on the length of the transversal travel path. It corresponds to the travel path plus the width of supply connection 5.

Sliding seal 11 is permanently connected to the trough and extends under horizontal cover 12. A slight leakage can be accepted since the trough is maintained in a slight vacuum via the dedusting device, so that air can flow only form the outside inward but not vice-versa.

Loading apparatus 9 can be designed as a double bellows of suitable corrugations, for example. During the filling process, air escapes form the vehicle container via the space between the inner and the outer bellows of the apparatus toward the trough and is guided there along at a side wall separately from the dust-like material in the direction of dedusting connection 6.

What is claimed is:

1. A powder gravity filing device for connecting a stationary tubular connector to an upwardly extending opening of a tank mounted on a vehicle, comprising a stationary vertically disposed tubular member, said vertically disposed tubular member terminating in a downwardly facing opening, a horizontally disposed planar member mounted about the opening of said vertically disposed tubular member and substantially flush therewith, said planar member having a downwardingly facing underside, said opening extending downwardly through said horizontally disposed planar member, a vertically extending elongated funnel member mounted on a movable first carriage below said horizontally disposed planar member, said funnel member having an upwardly facing rim vertically displaced from the undersided of said horizontally disposed planar member, a flexible wiping seal, said seal being mounted on said rim of said funnel and dimensioned in an upward vertical direction whereby it is in wiping abutment with the underside of said horizontally disposed planar member, said movable carriage being mounted on a first set of wheels, said first set of wheels being disposed on a second carriage whereby said first carriage may be reciprocatingly moved in one direction, said second carriage being mounted on a second set of wheels, said second set of wheels being disposed on a stationary horizontal surface whereby said second carriage for reciprocatingly may be moved in a direction transverse to the movement of said first carriage, said funnel terminating downwardly in a flexible conduit whereby to transport therethrough downwardly the powder into the said opening of said tank.

2. The device of claim 1 wherein the stationary vertically disposed member is connected at the side thereof to a dedusting means.

* * * * *